United States Patent
Kim

(10) Patent No.: US 6,906,987 B2
(45) Date of Patent: Jun. 14, 2005

(54) METHOD AND APPARATUS OF RECORDING DATA OPTIMALLY ONTO A SPEED-CHANGING DISK

(75) Inventor: Joung Woo Kim, Suwon-si (KR)

(73) Assignee: Hitachi-LG Data Storage Korea, Inc., Seoul (KR)

(*) Notice: Subject to any disclaimer, the term of this patent is extended or adjusted under 35 U.S.C. 154(b) by 477 days.

(21) Appl. No.: 10/225,276

(22) Filed: Aug. 22, 2002

(65) Prior Publication Data

US 2003/0081517 A1 May 1, 2003

(30) Foreign Application Priority Data

Oct. 29, 2001 (KR) ........................................ 2001-66844

(51) Int. Cl.[7] ................................................ G11B 7/00
(52) U.S. Cl. ................ 369/47.1; 369/47.38; 369/47.48; 369/53.1; 369/59.1
(58) Field of Search ............................ 369/47.1, 47.15, 369/47.28, 47.3, 47.36, 47.38, 47.48, 53.1, 53.34, 59.1, 59.15, 59.26

(56) References Cited

U.S. PATENT DOCUMENTS 5,010,540 A * 4/1991 Fuji et al. .................. 369/47.4
6,658,593 B1 * 12/2003 Ko .............................. 360/53

* cited by examiner

*Primary Examiner*—Muhammad Edun
(74) *Attorney, Agent, or Firm*—Birch, Stewart, Kolasch & Birch, LLP

(57) ABSTRACT

The present invention relates to method and apparatus of recording data onto a disk recording medium in zoned-CLV mode while adjusting recording speed and recording condition adequately at every speed change point between zones. The present invention detects a current recording position while recording data along a track of the disk recording medium, adjusts a recording speed and resets both a write strategy and a base B-level used for running OPC to be suitable for the adjusted recording speed. The present invention can record input data onto a writable disk with the most suitable writing condition at the highest allowable speed.

16 Claims, 4 Drawing Sheets a, b, c : Speed Transition Points a, b, c : Speed, Writing Strategy, B-level basis are changed
A, B, C : Zone Buffers

METHOD AND APPARATUS OF RECORDING DATA OPTIMALLY ONTO A SPEED-CHANGING DISK

BACKGROUND OF THE INVENTION

1. Field of the Invention

The present invention relates to method and apparatus of recording data onto a disk recording medium in zoned-CLV mode while adjusting recording speed and recording condition adequately at every speed change point between zones.

2. Description of the Related Art

In general, a disk device for writing/reading data to/from a disk recording medium equips with a memory that stores an optimal write strategy of each disk manufacturer, which is identified by a disk code, for each recording speed in order to conduct optimal writing onto an inserted writable disk. Thus, when a data record is requested, the disk device detects a disk code of an inserted disk first, selects an optimal write strategy stored in the memory based on the detected disk code and a recording speed set by a user, and applies the selected write strategy to a recording mechanism that conducts the requested data record.

Consequently, in the conventional art, the selected optimal write strategy is applied to data recording onto a program area of the inserted disk as well as test recording for detecting an optimal writing power.

Meantime, data is recorded onto a rotating disk in CLV (Constant Linear Velocity) 101 or CAV (Constant Angular Velocity) manner 102 as shown in FIG. 1. In the CLV manner, rotating speed must be decreased gradually as a recording position goes outward, so that high speed recording can not achieved by the CLV manner. In CAV manner, recording speed is increased as a recording position goes outward, however, it may be too high to record data onto a track at an outer area. To suppress non-recordable high speed, rotating speed is set such that recording speed at an inner area is very low.

For resolving the respective drawbacks of the two recording manners, a zoned-CLV manner has been introduced. In the zoned-CLV manner, a disk is partitioned into several zones, and CLV is applied within individual zones whereas CAV is applied between zones, as depicted in FIG. 2. Therefore, the zoned-CLV inevitably has recording speed transition points (marked 'a','b','c' in FIG. 2).

In case that data is to be recorded at maximum recording speed of each zone, if an initial optimal write strategy selected at start up is maintained up to record end, the write strategy is not optimal after recording zone is changed because recording speed has been increased at a changed zone. Consequently, overall recording operation is not conducted optimally.

For ensuring optimal recording up to record end, recording speed at next zone must be maintained as previous even though recording zone is changed. For example, if record is started at 12× speed at the zone 'a–b' of FIG. 2, 12× speed 201 is still maintained at next zones 'b–c' and 'c–d'.

However, such a record can not use maximum recording speed allowable at each zone, so that recording time takes relatively long in comparison with maximum-speed recording at each zone.

Meantime, a recording position goes outward along a spiral track while recording is progressed. However, media characteristic such as thickness is different between inner and outer area, so that it is necessary to compensate such a difference to keep a writing power optimal. For compensation, a disk device detects a B-level reflected by a certain writing pulse, e.g., 11T signal at a start-up operation as shown in FIG. 3, and memorizes the detected level as a base one. Afterwards, if a detected B-level deviates from the memorized base level as a recording position goes outward during data recording, the disk device adjusts an optimal writing power minutely to compensate the B-level deviation This compensating operation is called a running OPC (Optimal Power Calibration).

By the way, as aforementioned, a recording speed must be changed every zone change in the zoned-CLV recording mode if data is to be recorded at maximum recording speed allowable at each zone. Thus, if recording zone is changed, recording speed becomes different from start speed at which the base B-level is detected. In spite of speed change, if running OPC is progressed on a basis of the initial memorized B-level, a minutely-adjusted writing power can not be optimal.

SUMMARY OF THE INVENTION

It is an object of the present invention to provide method and apparatus that record data onto a disk recording medium in zoned-CLV manner while detecting speed transition points of the disk recording medium and adjusting a recording condition as well as a recording speed every detection of speed transition point.

It is another object of the present invention to provide method and apparatus that record data onto a disk recording medium in zoned-CLV manner while not only adjusting a recording speed but also resetting a base value for a running OPC to be used after speed change whenever a speed transition point of the disk recording medium is detected.

A method of recording data onto a disk recording medium in accordance with the present invention detects a current recording position while recording data along a track of a disk recording medium, adjusts a recording speed and a write strategy if the detected current recording position is among predetermined speed-change locations, and applies the adjusted write strategy to a recording process.

Another method of recording data onto a disk recording medium in accordance with the present invention detects a current recording position while recording data along a track of a disk recording medium, adjusts a recording speed and detects newly a reflected level by a writing pulse after speed-up by the adjustment if the detected current recording position is among predetermined speed-change locations, and sets the detected new level as a base one-for a running OPC.

BRIEF DESCRIPTION OF THE DRAWINGS

The accompanying drawings, which are included to provide a further understanding of the present invention, illustrate the preferred embodiments of the invention, and together with the description, serve to explain the principles of the present invention, and wherein.

DETAILED DESCRIPTION OF THE PREFERRED EMBODIMENT

In order that the invention may be fully understood, a preferred embodiment thereof will now be described with reference to the accompanying drawings.

Figure 1:
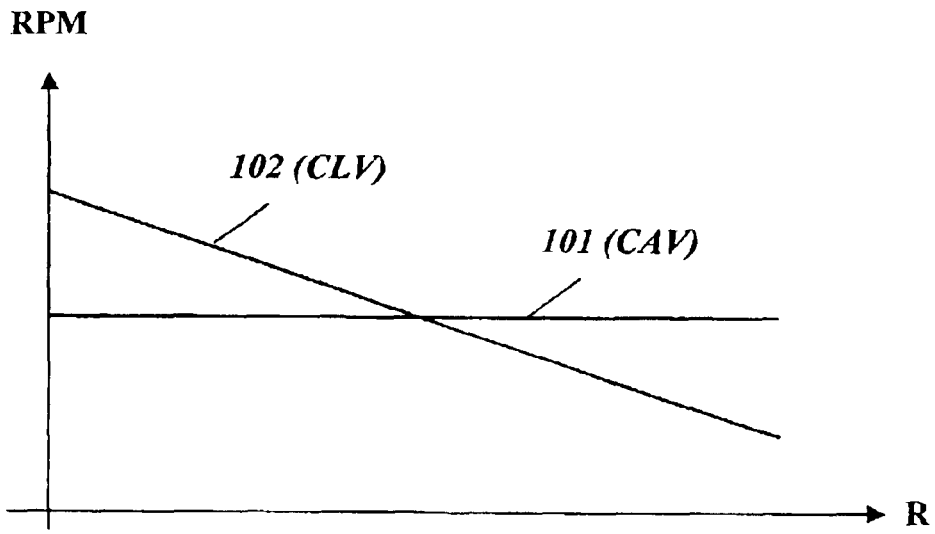
FIG. 1 shows two data recording manners for a rotating disk.
Figure 2:
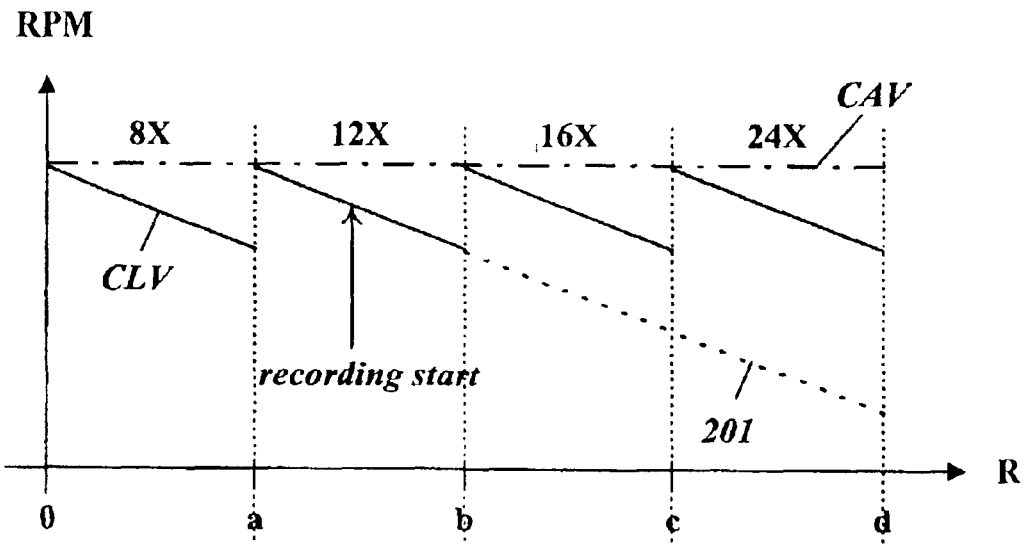
FIG. 2 shows a zoned-CLV recording manner.
Figure 3:
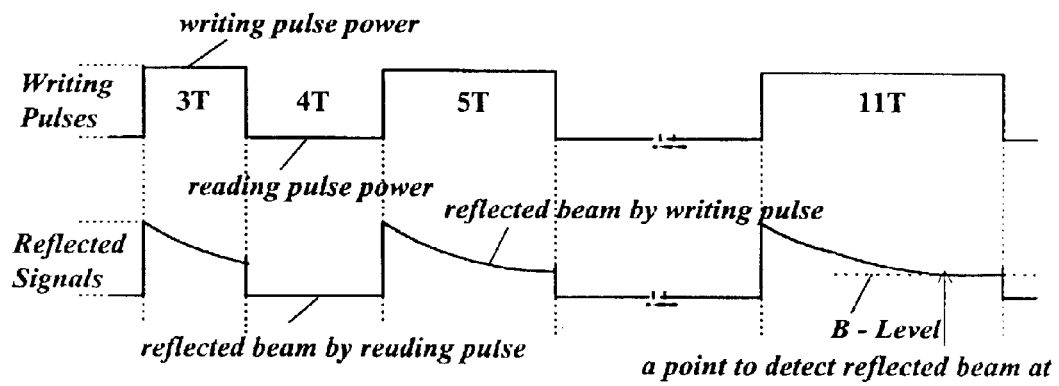
FIG. 3 shows relationship between writing/reading pulses and reflected level thereby.
Figure 4:
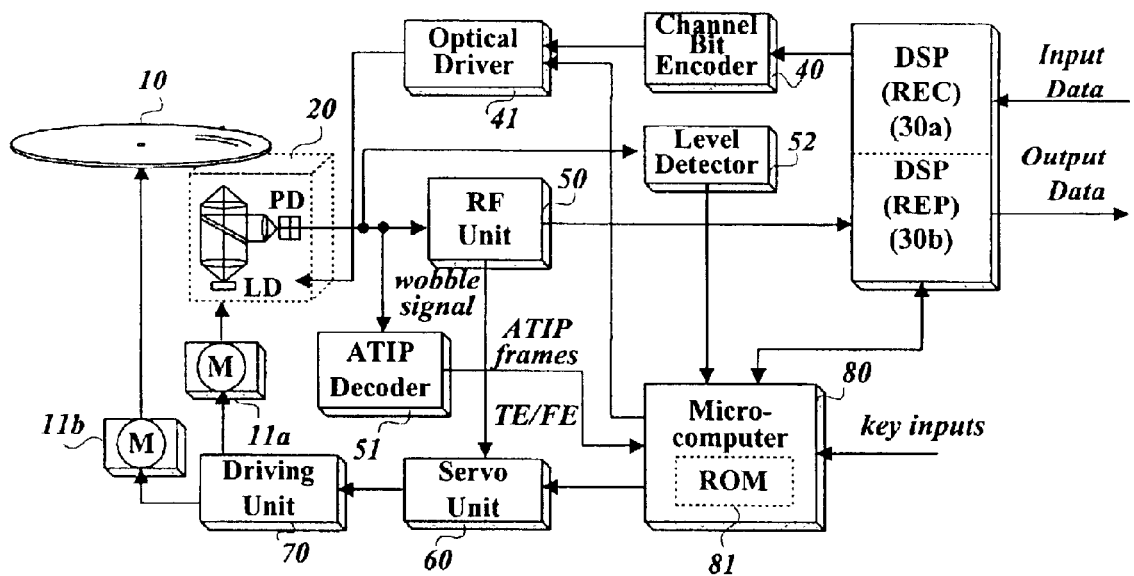
FIG. 4 is a simplified block diagram of a disk device in which an optimal data recording method of the present invention is embedded.

FIG. 4 is a simplified block diagram of a disk device in which an optimal data recording method of the present invention is embedded.

The disk drive of FIG. 4 comprises a digital recording signal processing unit 30a for converting input data into record-formatted EFM (Eight to Fifteen Modulation) data while adding additional data such as error correction codes (ECC); a channel bit encoder 40 for converting the record-formatted data into writing signals; an optical driver 41 for yielding signals to drive an LD (Laser Diode); an optical pickup 20 for writing signals onto surface of a writable disk 10 and for reading written signals from the surface of the optical disk 10; an R/F unit 50 for producing binarized signals and TE (Tracking Error) and FE (Focusing Error) signal through filtering and combining the signals detected by the pickup 20; an ATIP decoder 51 for producing ATIP (Absolute Time In Pregroove) frames by decoding a wobble signal detected from the writable disk 10; a level detector 52 for detecting a beam level reflected from marks or spaces formed on the disk 10 by writing signals; a driving unit 70 for driving a sled motor 11a to move the optical pickup 20 and a spindle motor 11b to rotate the disk 10; a servo unit 60 for conducting tracking/focusing operation of an objective lens in the pickup 20 and controlling the driving unit 70 to rotate the disk 10 at a constant speed; a digital reproduced signal processing unit 30b for restoring original data from the binarized signals using a self clock synchronized with the binarized signals in phase; and a microcomputer 80 for controlling an overall recording/reproducing operation, especially, for adjusting a base B-level as well as recording speed at every speed transition point in a zoned-CLV recording manner, and changing a write strategy to be optimal to adjusted recording speed with reference to write strategies for each recording speed, classified by disk codes (or company codes), stored in an internal ROM 81.

Figure 5:
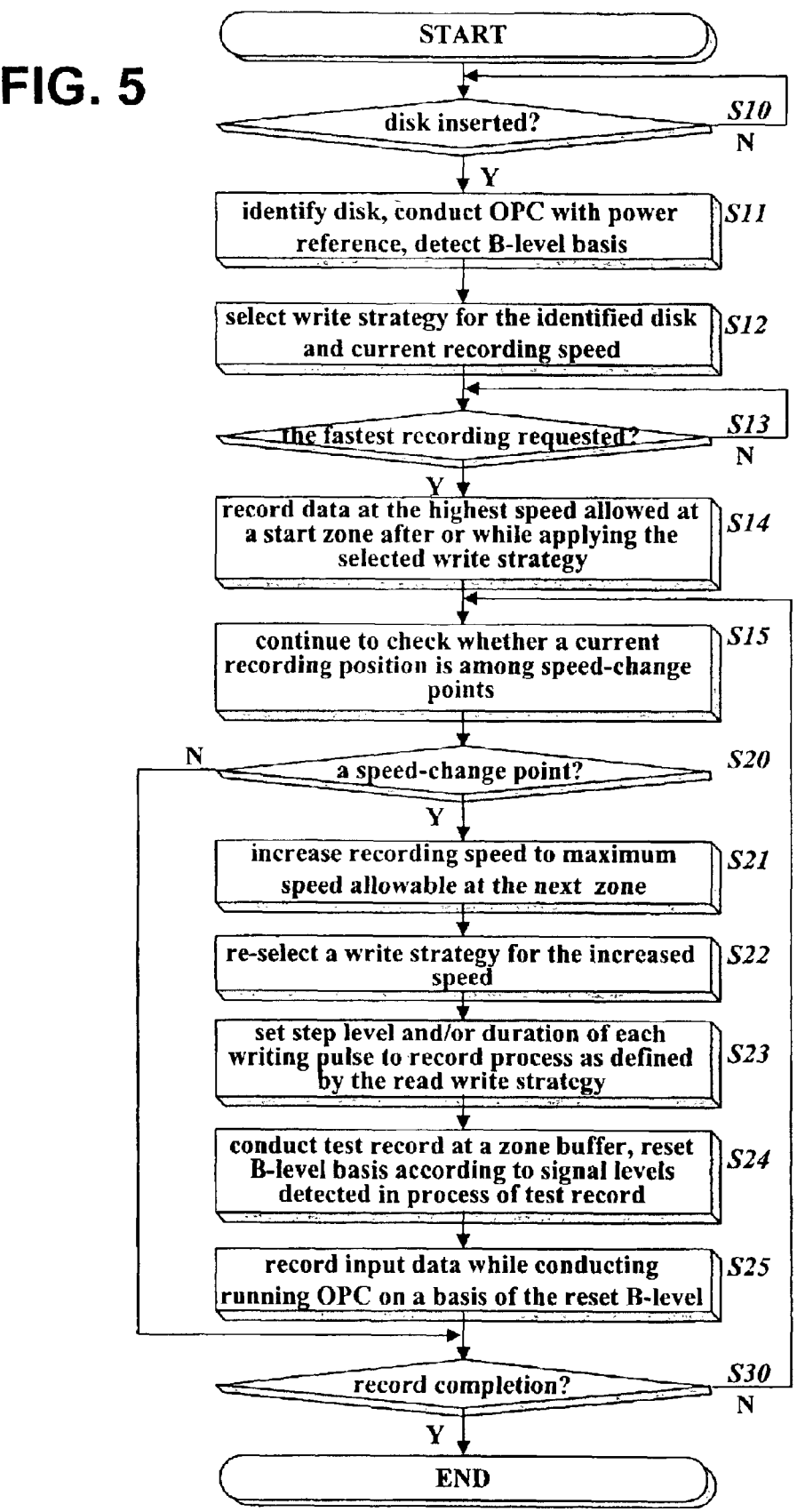
FIG. 5 is a flow chart of a preferable embodiment of an optimal data recording method in accordance with the present invention.

FIG. 5 is a flow chart of a preferable embodiment of an optimal data recording method in accordance with the present invention. The flow chart of FIG. 5 conducted by the disk device structured as FIG. 4 is explained in detail below.

If a writable disk 10 is normally placed onto a tray (not shown) equipped in the disk device (S10) it is rotated at a constant speed under control of the microcomputer 80. At the same time, the microcomputer 80 analyses ATIP frames outputted from the ATIP decoder 51 to search frames decoded from a lead-in area for the first (Frame No. N) and the 11th (Frame No. N+10) frame, namely, the first and second special information. Each ATIP frame is composed of three bytes called 'Minutes', 'Seconds' and 'Frames'. MSBs of three bytes of the two frames are '101' and '110', respectively. The first frame includes information about reference of an optimal writing power and disk type while the 11th frame includes information on start time of a lead-in area.

If the two frames are found, the microcomputer 80 reads out three bits of M2:M3:M4, which is indicative of the reference of optimal writing power, from the first frame and entire bits from the 11th frame (S11). At this time, the microcomputer 80 replaces three bits of M1:S1:F1 with '100' for the 11th frame.

The start time written in the 11th frame has different value if a manufacturing company is different. Therefore, the microcomputer 80 can identify which company has manufactured the inserted disk 10 based on the read-out start time. Instead of the 11th frame, the microcomputer 80 can also identify the manufacturing company or disk based on start time of a lead-out area written in the 21st (Frame No. N+20) frame, namely, the third special information.

The microcomputer 80 conducts an OPC in a PCA area of the disk 10. In OPC, the microcomputer 80 records test data while adjusting a writing power on a basis of the reference of optimal writing power, and reads the recorded test data. Based on characteristic of the read test data, an actual optimal recording power is determined (S11).

While the OPC is progressed, a B-level by a 11T writing signal is also detected and memorized as a base value (S11).

Figure 6:
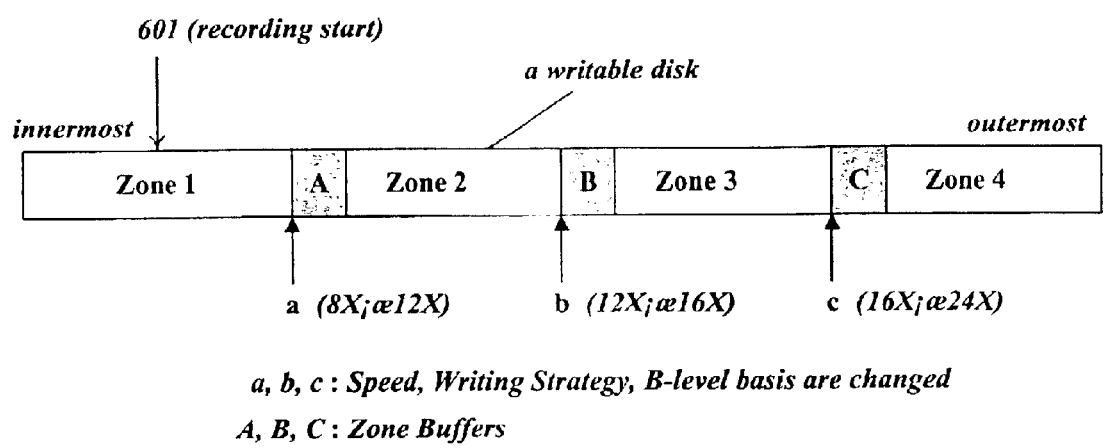
FIG. 6 illustrates recording-speed change points of an optical disk and maximum recording speed allowable in each zone.

Afterwards, the microcomputer 80 determines where data is to be recorded, namely, a recording zone and position within the zone. If zone and position are determined, maximum speed allowable at the zone is determined too. For example, if record starts from 601 as shown in FIG. 6, the maximum speed is 8×. The microcomputer 80 selects a write strategy most suitable to the identified disk code (company code) and the determined current recording speed from the internal ROM 81 (S12).

If the most high-speed recording is requested from a user (S13) after the above pre-operation, the microcomputer 80 conducts data record at 8× that is the highest speed allowed at the start zone after or while applying the selected write strategy to the optical driver 41 (S14). Because the recording speed is same as when the base B-level is detected while record is progressed within the start zone, the running OPC is still conducted to compensate B-level difference on a basis of the initial base B-level.

While the disk 10 is rotating at maximum 8× speed to record from the first zone 'zone 1' as shown in FIG. 6, input data is recorded as follows. Input data is encoded with parity by the digital recording signal processing unit 30a to form ECC blocks to improve reliability of data recording/reproduction. Each ECC block is outputted in EFM-formatted serial bits from the digital recording signal processing unit 30a to the channel bit encoder 40 that modulates the serial bits into NRZ signals. The optical driver 41 outputs PWM (Pulse-Width Modulated) writing signals according to the modulated NRZ signals while adjusting step level and/or duration of the PWM signal in accordance with the selected write strategy. The outputs of the optical driver 41 are converted by the optical pickup 20 to light beams that form respective marks and spaces along a track of the writable disk 10.

During the above recording operation, the microcomputer 80 continues to check whether a current recording position is among speed-change points, e.g., the points 'a', 'b', and 'c' marked in FIG. 6 (S15). If it is not, the microcomputer 80 conducts the above recording operation and the running OPC on a basis of the initial base B-level. However, if it is one of the speed change points, e.g., the point 'a' of FIG. 6 (S20), the microcomputer 80 controls the driving unit 70 through the servo unit 60 to increase the recording speed from 8× to 12× that is maximum speed at the second zone 'zone 2' (S21).

Whether the current recording position is at one of the speed change points, namely, each boundary between zones is determined based on a time code of an ATIP frame outputted from the ATIP decoder 51 during data record. In other words, the microcomputer 80 regards the current position as one of the speed change points when the time code written in an ATIP frame is indicative of the boundary, 'a', 'b', or 'c' marked in FIG. 6.

Then, the microcomputer 80 reads out a write strategy for the adjusted 12× speed from the internal ROM 81 (S22), and sets step level and/or duration of each writing pulse to the optical driver 41 as defined by the read write strategy (S23).

At the same time, the microcomputer 80 conducts test data recording on a zone buffer between neighboring zones, marked 'A' in FIG. 6, at the increased recording speed 12× while storing B-level values detected by the level detector 52 from successive writing signals. At end of the zone buffer, the microcomputer 80 calculates an average of the stored B-level values, and then sets the average to a new base B-level (S24).

While recording test data onto the zone buffer, the input data is buffered. When the second zone begins, the buffered data and subsequent data starts to be recorded. While data is recorded onto the second zone, the running OPC is conducted with the new base B-level determined at the 12× speed (S25).

The above-explained write strategy adjustment and base B-level updating in the course of the writing process are conducted whenever the recording zone is changed, namely, at the points 'b' and 'c' in FIG. 6.

The above-explained optimal data recording method and apparatus can record input data onto a writable disk with the most suitable writing condition at the highest allowable speed.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of recording data onto a disk recording medium, comprising the steps of:
    (a) detecting a current recording position while recording data along a track of the disk recording medium; and
    (b) adjusting a recording speed and a write strategy if the detected current recording position is among predetermined speed-change locations, and applying the adjusted write strategy to recording process.

2. The method of claim 1, wherein the write strategy defines conditions regarding level and/or duration of pulse signals to be written onto the disk recording medium.

3. The method of claim 1, wherein said step (b) selects a write strategy associated with identifying information detected from the disk recording medium and the adjusted recording speed, and applies the selected write strategy to the recording process.

4. The method of claim 3, wherein said identifying information is start time of a lead-in area written in an ATIP frame.

5. The method of claim 3, wherein said identifying information is start time of a lead-out area written in an ATIP frame.

6. The method of claim 1, wherein the current recording position is detected based on time codes written in ATIP frames detected during data record.

7. A method of recording data onto a disk recording medium, comprising the steps of:

(a) detecting a current recording position while recording data along a track of the disk recording medium on a basis of a preset reflected level for a writing pulse;
    (b) adjusting a recording speed if the detected current recording position is among predetermined speed-change locations, and detecting a new signal level for the writing pulse reflected from the current recording position at the adjusted recording speed, and setting the detected new level as a base level; and
    (c) conducting data record onto the disk recording medium at the adjusted recording speed while adjusting a writing power based on a difference between each reflected level by the writing pulse and the base level set newly.

8. The method of claim 7, wherein said step (c) selects a write strategy associated with the adjusted recording speed, and conducts the data record with application of the selected write strategy.

9. The method of claim 7, wherein the current recording position is detected based on time codes written in ATIP frames detected during data record.

10. The method of claim 7, wherein said step (b) detects reflected levels while writing pulse signals onto a buffer area reserved around the speed-change location, and sets an average of the detected levels as the base level.

11. An apparatus of recording data onto a disk recording medium, comprising:
    a data writer writing input data onto the disk recording medium with corresponding a writing beam;
    a drive rotating the disk recording medium;
    a position detector detecting location information written along a track of the disk recording medium;
    a level detector detecting signal level reflected by the writing beam during data writing of said data writer; and
    a controller adjusting a recording speed and changing a write strategy of said data writer, and setting a signal level detected by said level detector after the recording speed adjustment to a new base level used for minute adjustment of writing power to be kept optimal during subsequent data record, if the location information detected by said position detector is indicative of one of predetermined speed-change locations.

12. The apparatus of claim 11, wherein the location information is time code written in each ATIP frame that is detected during data record.

13. The apparatus of claim 11, wherein the signal level is obtained in process of pulse writing onto an area right before or after each speed-change location.

14. The apparatus of claim 11, wherein said controller selects a write strategy associated with identifying information detected from the disk recording medium and the adjusted recording speed, and replaces an old write strategy with the selected write strategy.

15. The apparatus of claim 11, wherein said controller adjusts a writing power of said data writer based on a difference between the new base level and a reflected signal level by the writing beam detected during the subsequent data record at the adjusted recording speed.

16. The apparatus of claim 11, wherein the write strategy defines conditions regarding level and/or duration of pulse signals to be written onto the disk recording medium.

* * * * *